UNITED STATES PATENT OFFICE.

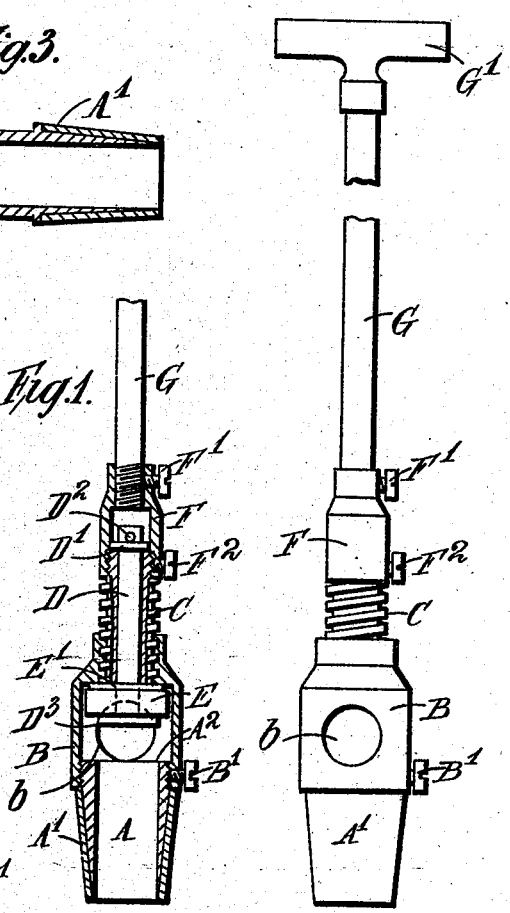

RICHARD STEPHEN GODSON, OF PAIGNTON, ENGLAND.

MEANS FOR PLUGGING THE OUTLET-PIPES OF CISTERNS.

No. 905,172.   Specification of Letters Patent.   Patented Dec. 1, 1908.

Application filed January 2, 1906. Serial No. 294,220.

*To all whom it may concern:*

Be it known that I, RICHARD STEPHEN GODSON, a subject of the King of Great Britain and Ireland, and resident of "Waverley," Paignton, county of Devon, England, have invented certain new and useful Improvements in Means for Plugging the Outlet-Pipes of Cisterns, (for which I have obtained a patent in Great Britain, No. 694, bearing date of January 13, 1905,) of which the following is a specification.

This invention relates to improved means (removable at will) for plugging the outlet pipes of cisterns and has for its object to obviate the present necessity of emptying a cistern and thus wasting water, or of resorting to the present method of a plumber having to thrust his arm (sometimes not too clean) into the water to cork or plug up the outlet pipe when anything has to be done to the taps or pipes supplied by the cistern.

My invention consists in a portable tool or plug which may be carried by the plumber for use when required.

In order that my said invention may be readily understood reference is to be had to the following description and accompanying sheet of drawings in which:—

Figure 1 is a vertical section; Fig. 2 a front elevation; Fig. 3 a sectional view of an elbow nozzle; and, Fig. 4 a plan view of the construction in Figs. 1 and 2. Fig. 5, is a plan view illustrating a slightly modified form of construction. Fig. 6, is a fragmentary sectional view of the spindle used in the modified form.

Like letters of reference indicate corresponding parts in the several figures.

In carrying my said invention into effect I form the nozzle A, Figs. 1 and 2, which is to fit into the outlet pipe of the cistern, of a taper form and provide the same with a cork ferrule A' to make a tight joint when inserted into the outlet pipe of the cistern.

B represents a chamber open to the water by holes $b$, said chamber being secured to the nozzle A by means of a V-screw and of the set screw B'. In the upper part of the chamber (body thereof) I arrange a screw threaded hole to receive the valve stem C, the latter being provided at its upper end with a V-threaded portion to receive the lower end of the cap F secured to the V-threaded portion by means of the set screw $F^2$. The upper end of said cap F I provide with a similar V-screw thread adapted to receive the screwed end of the operating rod G and secure said rod to cap by means of the set screw F'. The upper end of the rod G I provide with a handle G' of any appropriate shape and size, see Figs. 2 and 4.

The threaded valve stem C I provide internally with a hole in which the round spindle D works, said spindle D being an easy fit therein and provided at its lower end with a flat head $D^3$ to enter and fit within the nozzle A when screwed down, the leather or rubber washer or valve head E resting on its seating $A^2$ of the nozzle A.

The spindle D I provide at its upper end with a washer D' adapted to rest on the top of the threaded valve stem and secure said spindle in position by means of the pin $D^2$. The washer or valve head (leather or rubber) E I press on its seating $A^2$ by means of a metal washer E' in its turn depressed by C.

In use the apparatus is thrust into the water in the cistern (hand or arm not touching the water) till the corked tapered nozzle engages with the opening of the outlet pipe, then should the screwed valve stem C be screwed down, the passage of water through the openings $b$ in the chamber B to the outlet pipe is prevented, or if it is desired any quantity of water may be allowed to pass by reversing the movement of the valve stem C and consequently its attendant parts D and E. Having a spindle D independent of the valve stem C permits the ready removal or replacement of the valve or washer E without the necessity of removing the stem C, as will, it is thought, be plainly apparent.

Sometimes it may happen that the outlet pipe may be at the side of the cistern instead of the bottom, in which case I provide an elbow nozzle H as in Fig. 3, the taper end thereof being the same as that in the previous arrangement in Figs. 1 and 2.

In a modified form of construction when it is desired to clear the outlet pipe of water (especially in frosty weather) I provide the operating rod and valve spindle with passages $B^2$ and $B^3$ respectively lengthwise thereof so that when the valve is screwed down on its seating shutting off the passage of water from the cistern to the outlet a current of air may be passed down through said rod and spindle effectually clearing the outlet pipe.

Having thus described my invention, what I claim as new and desire to secure by Letters Patent of the United States is:—

1. In a device of the character described, a nozzle having a valve seat at its upper end, a valve casing attached to the nozzle, a valve stem threaded in the upper end of the casing, a valve head carried thereby, the said valve stem having a longitudinally disposed aperture, a spindle in the aperture, a head on the spindle extending below the valve head and adapted to enter the nozzle and means for retaining the spindle in the valve stem.

2. In a device of the character described, a nozzle having a valve seat at its upper end, a valve casing thereon, a valve stem threaded in the casing, a coupling attached to the valve stem, an operating handle thereon, a spindle within the valve stem, a valve head on the valve stem, and a head on the spindle below the valve.

In testimony whereof I have affixed my signature in presence of two witnesses.

RICHARD STEPHEN GODSON.

Witnesses:
 FLORENCE EMILE GODSON,
 HENRY CECIL GODSON.